US012681216B2

(12) United States Patent
Quaranta et al.

(10) Patent No.: US 12,681,216 B2
(45) Date of Patent: Jul. 14, 2026

(54) MICRO-LENS BASED MODULE COMPRISING NANOSTRUCTURED LAYER

(71) Applicant: Focuslight Switzerland SA, Hauterive (CH)

(72) Inventors: Giorgio Quaranta, Neuchâtel (CH); Wilfried Noell, Neuchâtel (CH); Christopher Bremer, Neuchâtel (CH)

(73) Assignee: Focuslight Switzerland SA, Hauterive (CH)

( * ) Notice: Subject to any disclaimer, the term of this patent is extended or adjusted under 35 U.S.C. 154(b) by 287 days.

(21) Appl. No.: 18/264,461

(22) PCT Filed: Feb. 7, 2022

(86) PCT No.: PCT/IB2022/051034
§ 371 (c)(1),
(2) Date: Aug. 7, 2023

(87) PCT Pub. No.: WO2022/168012
PCT Pub. Date: Aug. 11, 2022

(65) Prior Publication Data
US 2024/0045114 A1 Feb. 8, 2024

(30) Foreign Application Priority Data

Feb. 8, 2021 (EP) ..................................... 21155756

(51) Int. Cl.
*G02B 3/00* (2006.01)
*G02B 5/18* (2006.01)
(52) U.S. Cl.
CPC ......... *G02B 3/0056* (2013.01); *G02B 5/1809* (2013.01)

(58) Field of Classification Search
CPC .... G02B 5/1842; G02B 3/0056; G02B 27/20; G02B 5/1809; G02B 5/1814; G02B 5/201; G02B 5/28; G02B 27/425; G02B 27/4261; G02B 5/008; G02B 27/0961; F21S 41/285
See application file for complete search history.

(56) References Cited

U.S. PATENT DOCUMENTS

| | | | |
|---|---|---|---|
| 4,924,356 A | 5/1990 | French et al. | |
| 6,381,072 B1 | 4/2002 | Burger | |
| 2007/0218372 A1* | 9/2007 | Zalevsky | .............. G03F 7/0005 |
| | | | 430/5 |

(Continued)

FOREIGN PATENT DOCUMENTS

| | | |
|---|---|---|
| KR | 20200017017 A | 2/2020 |
| KR | 20210012484 A | 2/2021 |

OTHER PUBLICATIONS

International Search Report for PCT/IB2022/051034 dated May 9, 2022.
Written Opinion for PCT/IB2022/051034 dated May 9, 2022.

*Primary Examiner* — Jonathan Y Jung
(74) *Attorney, Agent, or Firm* — McDonald Hopkins LLC

(57) ABSTRACT
A micro-lens based module including at least one nanostructured layer, the nanostructured layer including one or several diffractive domains corresponding to an optical object. The claimed micro-lens based module allows dynamic and/or coloured projections of optical objects with an improved optical quality. The present invention also relates to a projection device and a method of projection of improved coloured and/or dynamic images.

20 Claims, 10 Drawing Sheets

(56) References Cited

U.S. PATENT DOCUMENTS

Figure 1:
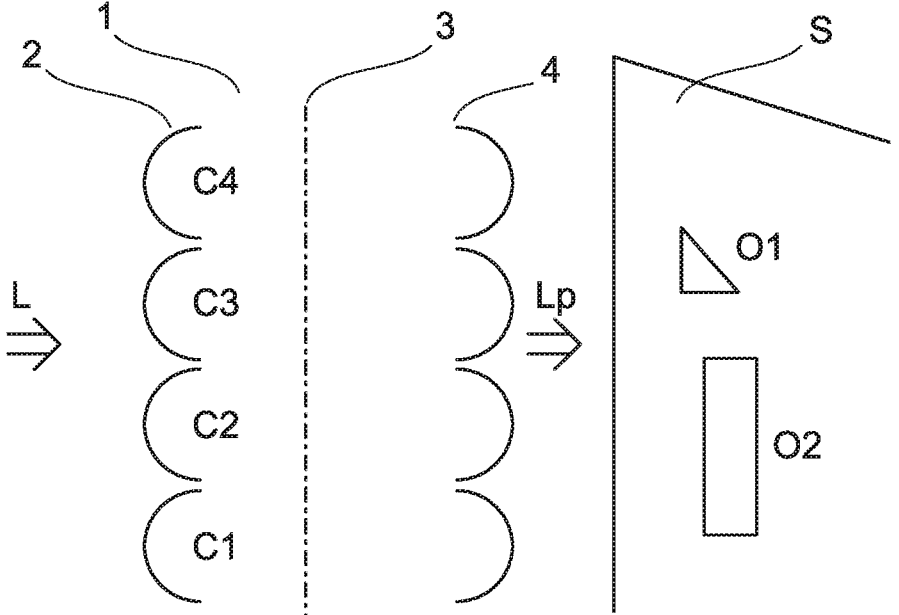

| 2009/0032511 | A1* | 2/2009 | Adams | B23K 26/0613 |
| | | | | 219/121.75 |
| 2010/0296061 | A1* | 11/2010 | Silverstein | G02B 27/48 |
| | | | | 353/38 |
| 2012/0092623 | A1 | 4/2012 | Huebner | |
| 2012/0250027 | A1* | 10/2012 | Zheng | G01N 21/554 |
| | | | | 356/402 |
| 2019/0041736 | A1* | 2/2019 | Grunnet-Jepsen | |
| | | | | G01B 11/2513 |
| 2019/0270403 | A1 | 9/2019 | Sobecki et al. | |
| 2020/0050094 | A1 | 2/2020 | Han et al. | |
| 2023/0353890 | A1* | 11/2023 | Gimkiewicz | H04N 23/55 |

* cited by examiner

MICRO-LENS BASED MODULE COMPRISING NANOSTRUCTURED LAYER

TECHNICAL DOMAIN

The present invention concerns a micro-lens based module and a projection device comprising the same. It relates in particular to a module and a device adapted for projecting coloured images or animated images on remote surfaces. An important application is in the field of the automotive industry.

RELATED ART

In vehicles, ambient lights and projection of some patterns on the internal surfaces, or even abroad the vehicle, is now developing. Micro lens arrangements such as micro-lens arrays (MLA) are currently used to this end to project images on surfaces. They are currently considered as convenient projection means because of their small hindrance and their low energy consumption. MLA are typically used for projecting black and white images or single coloured images. However, the projection of images having several colours remains challenging. Several light sources may be necessary. Furthermore, Additional lens, or lens arrays, should be arranged for each additional colour, which renders the complete device more costly and less compact. Furthermore, the pigments usually used for providing the colours may be subject to degradation over time, and under high temperature conditions. This limits the possible technical applications of such solutions.

The document US2011228231 provides examples of micro-lens array arrangements. Coloured objects can be projected by means of several combined micro-lens arrays each representing a primary colour. Transmissive LCD displays are used to this end.

The patent application WO2019223859 discloses example of micro-lens array comprising integrated coloured elements based on pigments. Although several images can be projected, this requires that several groups of lenses, combined to dedicated light sources, are arranged. The stability of the pigments over time remains an issue.

The coloured projected images may in addition be subject to some optical defects such as chromatic aberrations or image deformations. These drawbacks can impair the visual aspects of the projected images and negatively impact the perceived quality. A degraded quality of the projected image can also limit the field of applications. Applications related to safety or automatic control of devices, for example, can hardly be envisaged without a good quality of the projected optical signal.

It should also be considered that the multi-lens arrays allow so far to project static images on the surfaces. However, dynamic projections, including animated images, colours variations and/or shape modifications remain a challenging task. A dynamic projection usually requires bulkier elements such as LCD's or a combination of several multilens arrays. This kind of arrangements are thus not optimal for the exigent field of automotive due to their manufacturing cost and their energy consumption.

SHORT DISCLOSURE OF THE INVENTION

An aim of the present invention is the provision of a micro-lens based module or a combination thereof allowing to project on a surface different pictures. In particular, it is aimed at projecting different pictures on demand with a single light source emission and/or a single micro-lens module. Different pictures may differ in colour or in shape or in both colour and shape. It is aimed at providing a micro-lens based module still compact and cost effective.

It is another aim of the present invention to provide a micro-lens based module or a combination thereof allowing dynamic projection of images. The objective is to project images having dynamic shape variation or dynamic colour variation or both dynamic variation of shape and colour. In particular, it is aimed at projecting dynamic images based on a single light emitting source and/or a single micro-lens module.

It is another aim of the present invention to provide a micro-lens based module allowing the projection on a surface of a coloured image, either static or dynamic, having an improved quality, in particular, with less or not at all chromatic defects.

It is another aim of the present invention to provide an improved projection method using a micro-lens based module, or a combination thereof, allowing the projection of a micropattern on a surface.

It is another aim of the present invention to provide projection device comprising one or several micro-lens based module here described, and being adapted for the image projection. It is in particular an object to provide a compact projection device comprising at least one light source, or only one light source, combined with one or several micro-lens based module and being ready to plug or ready to use.

It is another object of the present disclosure to provide an equipment comprising a projection device as here described. The equipment denotes any equipment having an image projection function, and in particular a coloured and/or dynamic image projection function, either fix or mobile. The equipment denotes for example a motor vehicle, an electrical vehicle, an automated vehicle, or an autonomous vehicle. Such vehicle denotes any kind of vehicle, such as cars, trucks, cross land vehicles, warehouse automated vehicle and the like. Vehicles such as flying vehicles like aircrafts, drones, and related are also considered. Boats or other marine vehicles are also considered.

According to the invention, these aims are attained by the object of the dependent claims, and further described by the dependent claims.

With respect to what is known in the art, the invention provides improved compact micro-lens based modules and projection devices allowing dynamic projections of pictures and/or multi-coloured pictures with improved optical quality.

SHORT DESCRIPTION OF THE DRAWINGS

Exemplar embodiments of the invention are disclosed in the description and illustrated by the drawings in which:

FIG. 1: Example of a lens array according to the state of the art

Figure 2:
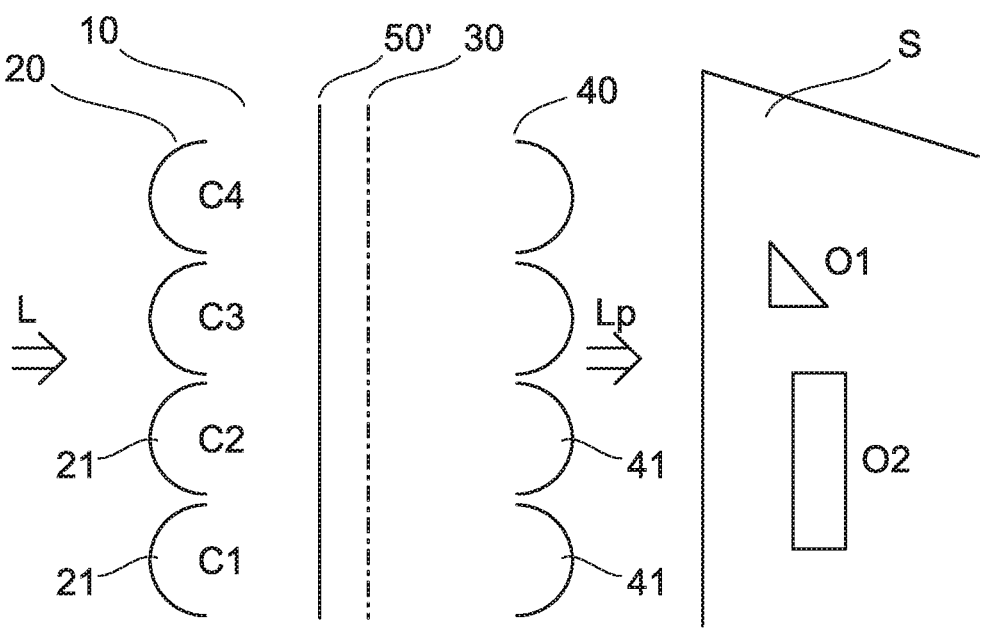

FIG. 2: Example of a multi-lens array according to the present disclosure.

Figure 2A:
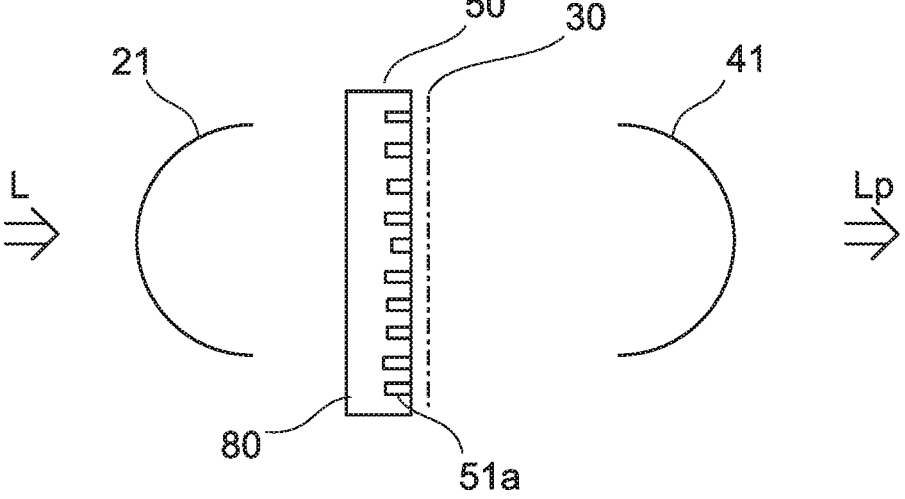

FIG. 2a: Example of a multi-lens array according to an embodiment of the present disclosure.

Figure 2B:
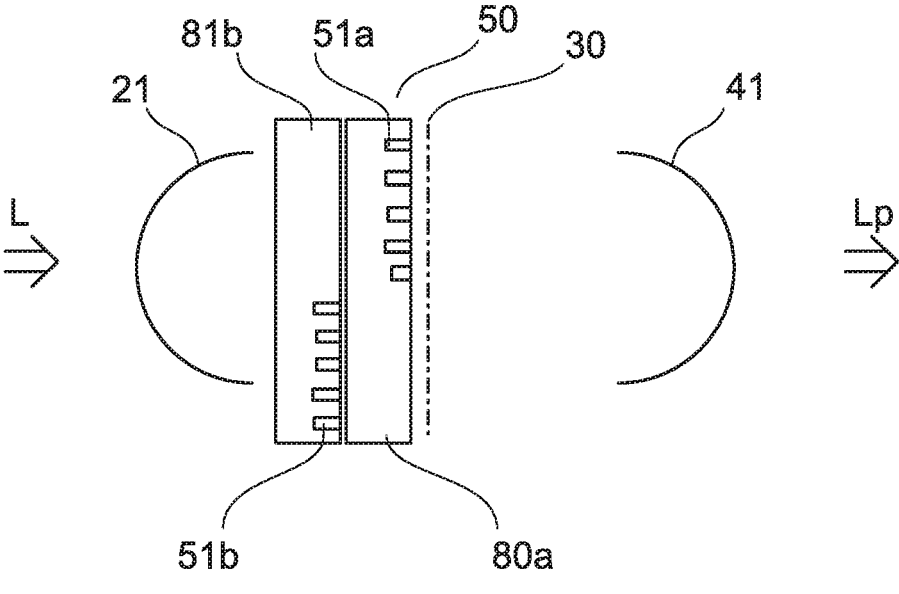

FIG. 2b: Example of a multi-lens array according to an embodiment of the present disclosure.

Figure 3:
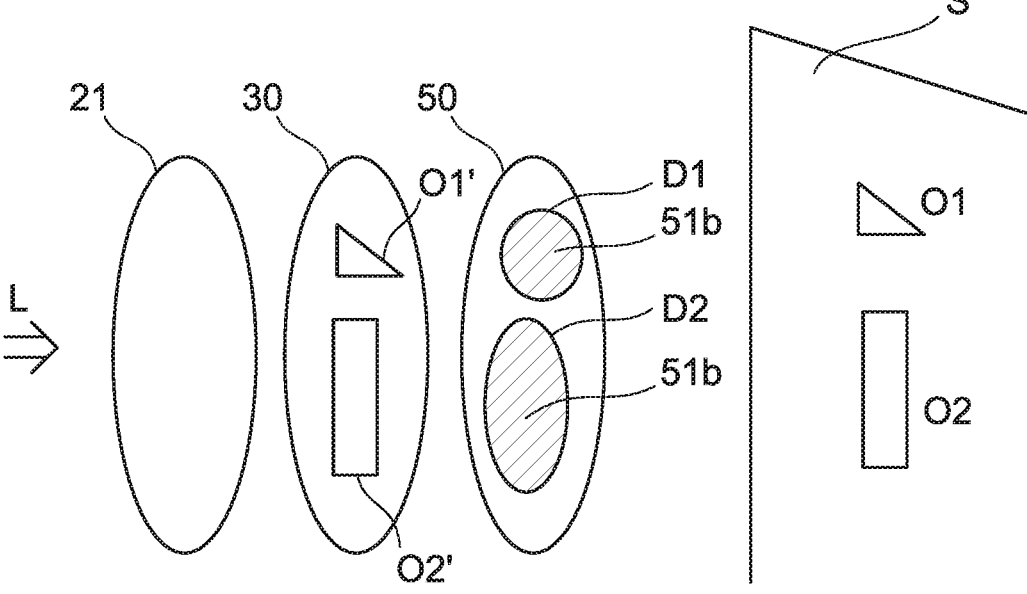

FIG. 3: Details of a multi-lens array according to an embodiment of the present disclosure.

Figures 4, 5A, 5B:
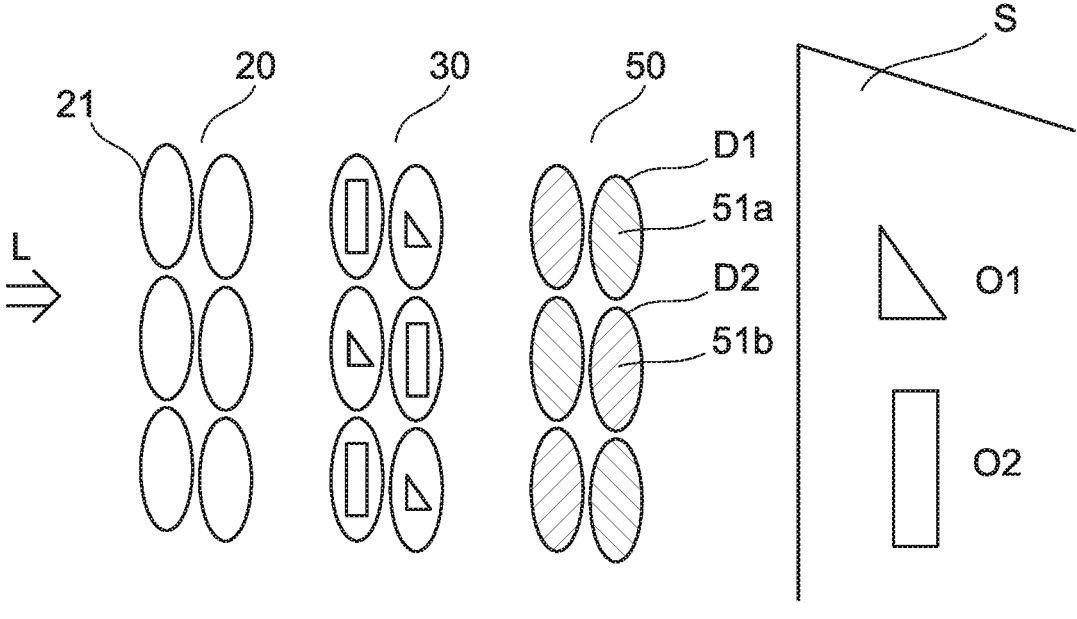

FIG. 4: Details of a multi-lens array according to an embodiment of the present disclosure.

FIGS. 5*a*, 5*b*: Example of a dynamic projection according to the present disclosure.

Figure 6:
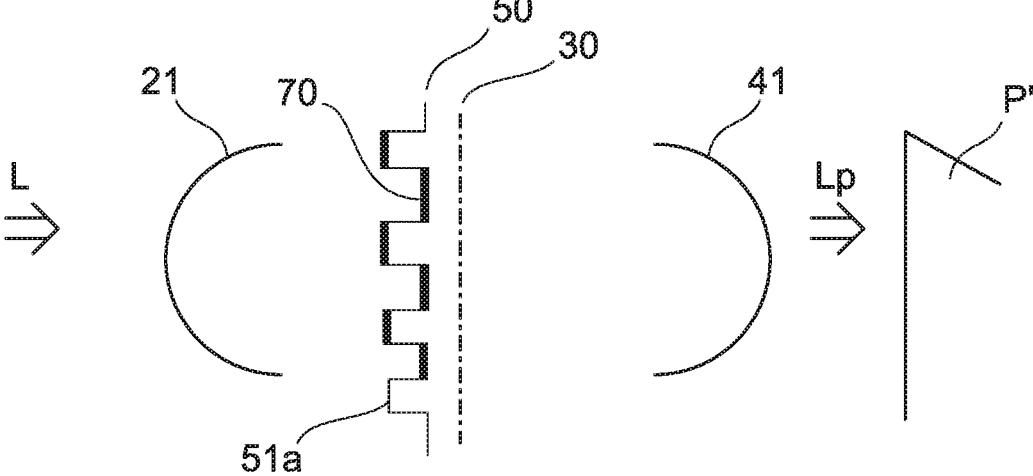

FIG. 6: Details of a multi-lens array according to an embodiment of the present disclosure.

Figure 7:
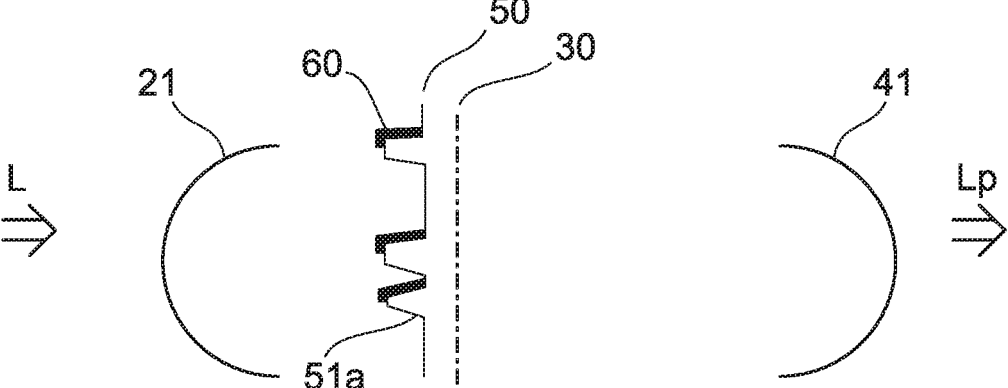

FIG. 7: Details of a multi-lens array according to an embodiment of the present disclosure.

Figure 8:
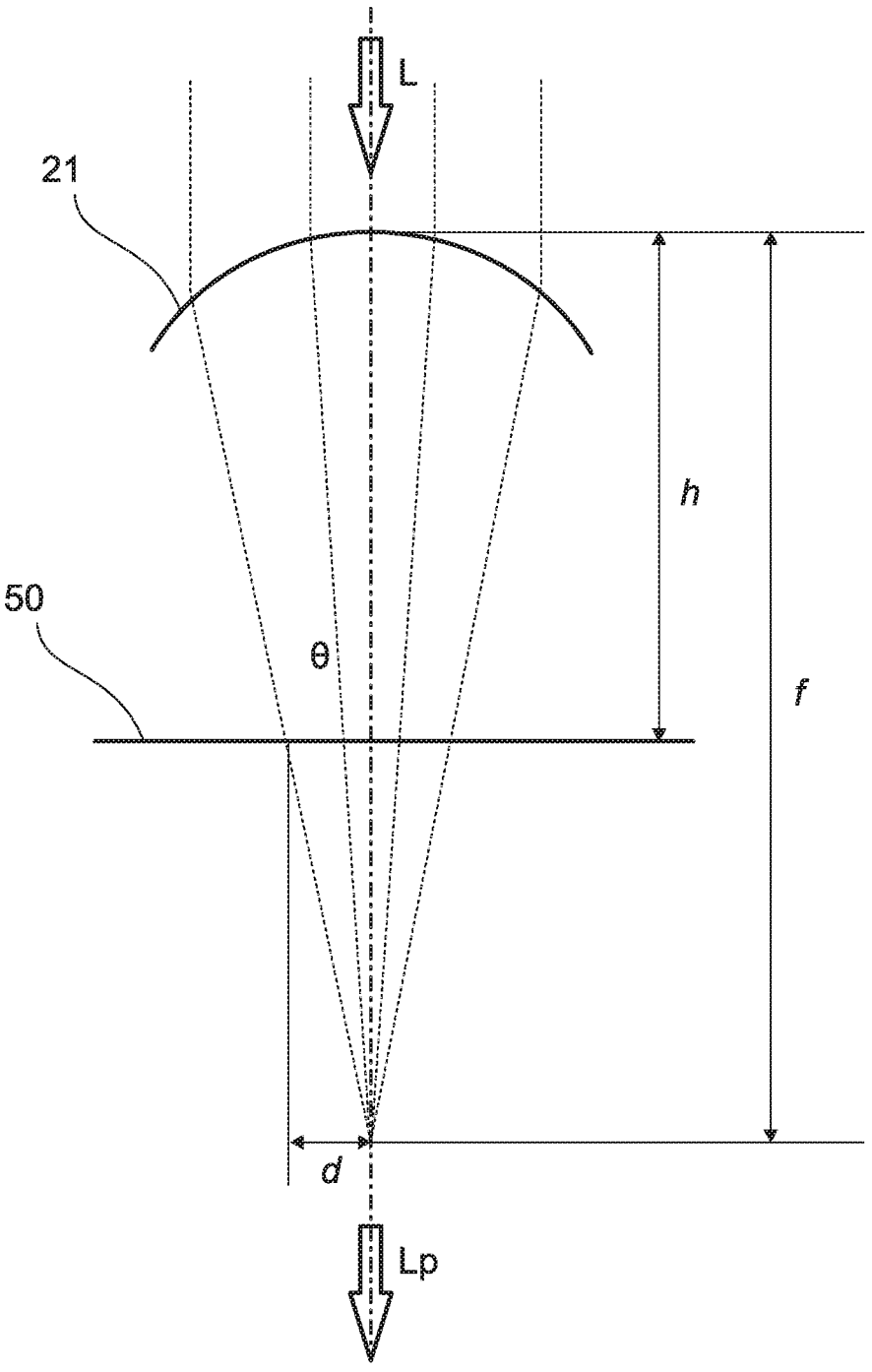

FIG. 8: Details regarding the arrangement of the nano-structured layer with regards a micro-lens.

Figure 8A:
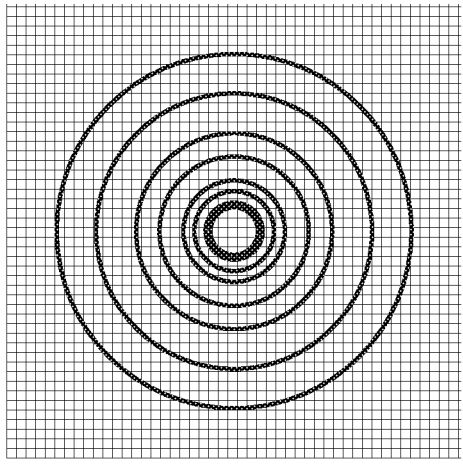
Figure 8B:
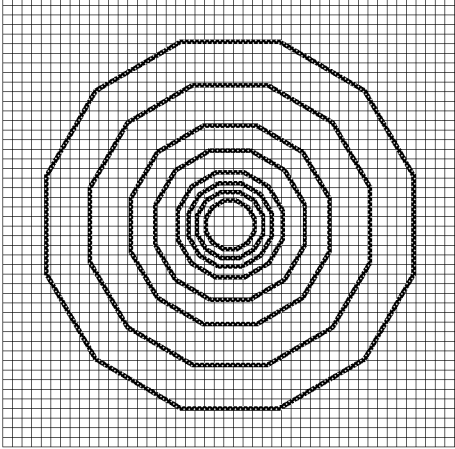

FIGS. 8*a*, 8*b*: Examples of nanostructure geometries.

Figure 9:
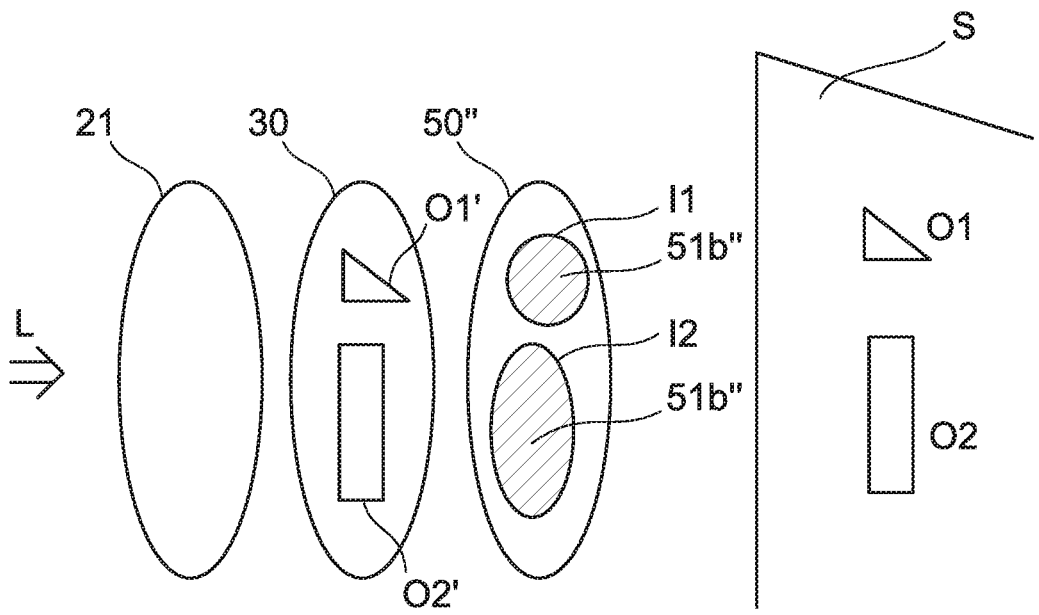

FIG. 9: Details of a multi-lens array according to an embodiment of the present disclosure.

Figure 10:
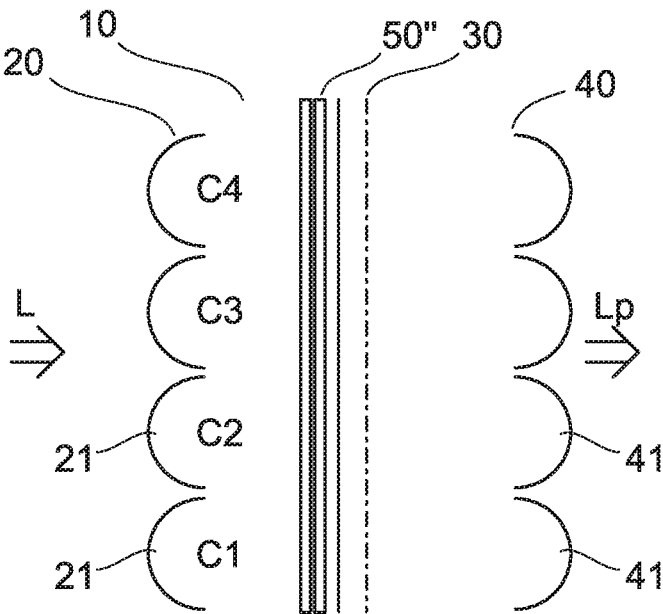

FIG. 10: Details of a multi-lens array according to an embodiment of the present disclosure, wherein the light alteration layer denotes an interference-based layer.

Figure 11:
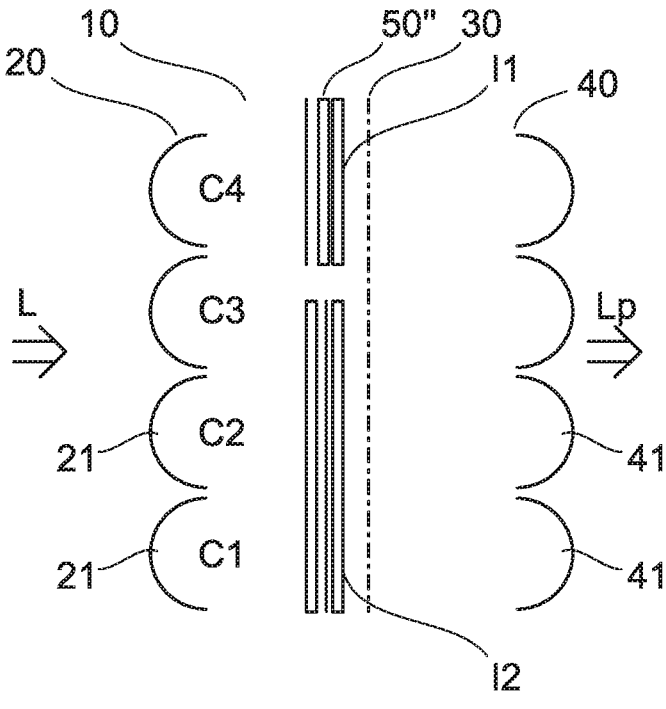

FIG. 11: Details of a multi-lens array according to an embodiment of the present disclosure, wherein the light alteration layer denotes an interference-based layer.

Figure 12:
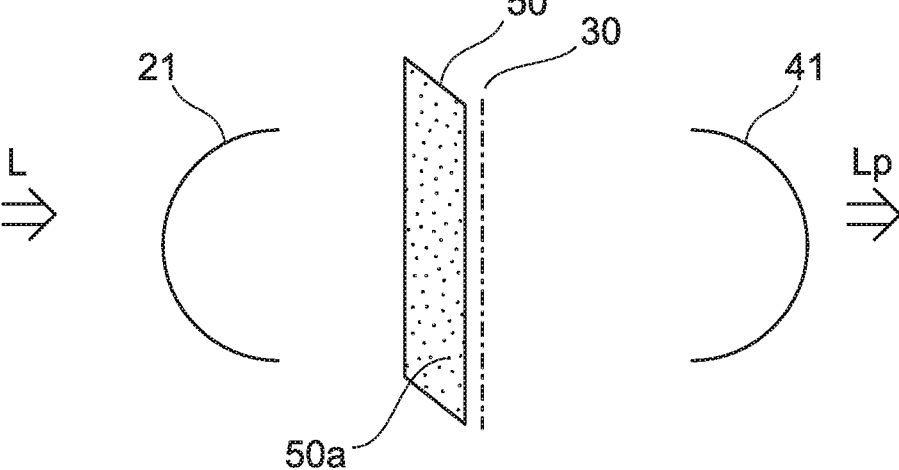

FIG. 12: Details of a multi-lens array according to an embodiment of the present disclosure, wherein the light alteration layer denotes a diffraction layer comprising nanoparticles.

Figure 13:
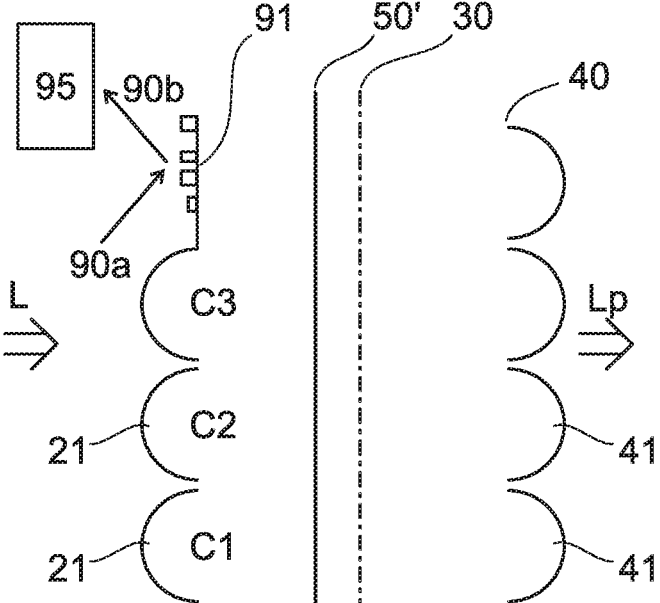

FIG. 13: Example of a dynamic projection device according to an embodiment of the present disclosure.

EXAMPLES OF EMBODIMENTS OF THE PRESENT INVENTION

FIG. 1 provides an example of a MLA projector 1 according to the state of the art. It typically comprises a first array of lenses 2, usually also a second array of lenses 4, and a mask 3 comprising a micro-pattern vis-à-vis the lenses. The micro-pattern is placed to shade-out an incident light L, which is usually collimated. The projected light Lp having crossed the micro-pattern, allows to provide on a surface S a single optical object $O_1$, $O_2$ representing the superposition of the images of the micro-pattern arranged on the mask 3. Some coloured transparent films may be combined to the mask 3 so that a coloured image can be projected on the surface S.

FIG. 2 shows an example of a micro-lens based module 10 according to the present invention. It comprises at least one of an entrance lens 21 and an exit lens 41.

According to an embodiment the micro-lens based module 10 according to the present disclosure can comprise a first lens array 20 comprising several entrance lenses 21 and a second lens array 40 comprising several exit lenses 41.

The micro-lens based module 10 according to the present disclosure preferably comprises a combination of an entrance lens 21 and an exit lens 41 or a combination of a first lens array 20 and a second lens array 40.

The first lens array 20 and second 40 lens arrays are preferably arranged as parallel arrays. The first lens array 20 faces a light source and receives the incident light L emitted by the light source. Such a light source may be a LED, an OLED, or any other suitable light source. The first lens array 20 can be defined as condenser lens array, or receiving lens array, a field lens array or entrance lens array, since it corresponds to a face of the micro-lens based module through which the light enters. The first lens array 20 is preferably oriented with regard to the incident light L emitted by the light source at an angle comprised between around 0° and around 20°, where 0° means parallel to the optical axes of the lenses. The first lens array 20 comprises a number of entrance lenses 21 which can be comprised between 2 and more than 500. The number of entrance lenses 21 can however be adapted without real limitation, depending on the application. They can be arranged as a square, a line, a rectangle, a disk or according to any other suitable two dimensional arrangement. They are preferably arranged on a flat surface. They can however form together a surface having a three dimensional shape such as a global concave or a convex shape. The entrance lenses 21 are preferably designed so that their focal point is opposite to the light source. The incident light L can thus converge behind the lenses with regard to the light direction. Although all the entrance lenses 21 are preferably identical, this does not exclude that some of the entrance lenses 21 have different shapes or focal characteristics.

The second lens array 40 is arranged behind the first lens array 21, when present, at a distance from the first lens array 20, which is larger than the focal distance of the entrance lenses 21 and/or larger than the focal distance of the exit lenses 41. The term "behind" denotes here the usual relative position with regards to the direction of the incident light L, from the light source toward a remote surface S. The second lens array 40 comprises several exit lenses 41, adapted to project an image abroad. The exit lenses 41 are preferably designed so that their focal point is opposite to the remote surface S on which is projected the image. The projected image is thus magnified. The exit lenses 41 can thus be defined as projector lenses or projection lenses, since they correspond to a face of the micro-lense based module through which the light exits as a projected light Lp. As for the entrance lenses 21, the number of exit lenses 41 can be comprised between 2 and 500. There is however no real limitation. They can be arranged as a plane square, line, rectangle, disk or according to any other suitable two dimensional arrangement, or form together a surface having a global three dimensional shape such as a global concave or a convex shape. Although all the exit lenses 41 are preferably identical, this does not exclude that some of the exit lenses 41 have different shape or focal characteristics.

The terms "lens array" in the present disclosure denote a group of at least two combined lenses, arranged side by side, and preferably in direct contact with each other or in close vicinity without separating elements. A lens array may group together two, three, four or more lenses so that they form a line, a square, a circular shape or any other suitable arrangement. In a given lens array, all the lenses can be identical or have the same shape and dimensions. There are also periodically arranged, in example in parallel lines or quincunx. Alternatively, one or both of shape and size may vary for at least some of the lenses of a lens array. Also, the lenses of a given lens array may be arranged in a non-periodical arrangement. Several lens arrays may be juxtaposed. The distance separating two neighboured lens arrays may be larger than the distance between two lenses of a given lens array.

The entrance lenses 21, as well as the exit lenses 41, are understood as being micro lenses due to their preferred size characteristics. The lens diameter is preferably comprised between around 100 μm and around 900 μm. They can be manufactured according to any suitable known process including one or more of moulding, micro machining, imprint lithography, reactive ion etching of photoresist material, additive manufacturing steps. The micro-lenses of the present disclosure can include the suitable transparent organic or inorganic polymers, mineral material such as silica based material and any suitable material.

The entrance lenses 21, as well as the exit lenses 41, can all have a circular or semi-circular shape showing a circular symmetry. Alternatively, some or all of these lenses can independently from each other have another three dimensional shape, in particular a non-circular symmetry, such as an elliptical geometry.

The entrance lenses 21, as well as the exit lenses 41, can all have an homogenous smooth surface having consistent optical properties. Alternatively, the surface of some or all of these lenses can independently from each other comprise micrometric alterations. In particular, such alterations can impact or improve the optical properties of the lens or generate optical effects on the projected image.

The entrance lenses 21, as well as the exit lenses 41, can all appear as standard conventional micro-lenses having the requested spherical shape. Alternatively, some or all of these lenses can independently from each other take the form of a Fresnel lens or any other diffraction-based optical element resulting in the same optical functions as conventional lenses.

In case both entrance lenses 21 and exit lenses 41 are present, they are facing each other so as to define an optical channel. In a preferred arrangement the lens vertex of a couple of entrance lens and exit lens, forming an optical channel, are aligned, meaning that they have a collinear optical axis. This however does not exclude that the vertex of at least some of couples of entrance and exit lenses of the micro-lens array are not aligned, meaning that the corresponding optical axis is slightly shifted with respect to each other.

The micro-lens based module 10 according to the present disclosure further comprises at least one light alteration layer 50' adapted to modify the optical properties of the incident light L. According to one embodiment, a light alteration layer 50' is a nanostructured layer 50 comprising several diffractive domains D1, D2 (FIGS. 2 to 4). Each diffractive domain comprises local corrugations 51a, 51b having a width comprised between around 10 nm and around 900 nm. Alternatively, the width of the local corrugation may be determined based on the wavelengths of the incident light. The width of the corrugations is preferably lower than the wavelengths of the incident light L or lower than a predetermined multiplier of the wavelengths such as lower than 2, 3, 5 or 5 times the wavelength. The local corrugations 51a, 51b define sub-wavelength elements. The corresponding width can thus be adapted according to the applied wavelengths, to the angles of the incident light in that specific place of the micro-lens based module, or to a combination of the applied wavelengths and the angle of the incident light at the corresponding specific place of the micro-lens based module. It is here highlighted that the place of a given lens of the micro-lens based module within a given lens array has an influence regarding the angle of the incident light, in particular when a single light source is used. The local corrugations 51a, 51b of the nanostructured layer 50 thus depend on the relative position of the corresponding lens and the light source.

It is here understood that the wavelengths can correspond to visible light so that a human can recognize the projected optical object $O_1$, $O_2$. The wavelengths can alternatively or in addition comprise non-visible light such as infrared or UV light. The corrugations 51a, 51b may be arranged as a periodic sequence. Alternatively or in addition, the corrugations can comprise non-periodic sequences. The corrugations can thus comprise sub-domains having periodic sequences and sub-domains having non-periodic sequences within a given diffractive domain D1, D2.

FIGS. 2a and 2b shows examples of nanostructured layer 50. Corrugations 51a may be embedded in a polymeric structure 80. For a given lens or couple of entrance and exit lenses, the nanostructured layer 50 may present different corrugations 51a, 51b embedded in different polymeric structures 81a, 81b. The corrugations 51a, 51b can thus be arranged on a same plan or on different plans, depending on their position within the polymeric structure 81a, 81b. Due to the thickness of the polymeric structures 81a, 81b, an offset between two vicinal corrugations can be managed. The corrugations 51a, 51b are preferably oriented in a plan parallel to the plan formed by the lens arrays, either the first lens array 20 or the second lens array 40. The plan of the corrugations 51a, 51b can alternatively be inclined within the thickness of the polymeric structures 81a, 81b by an angle of few degrees such as up to 5° or 10° with regard to the parallel plan above-mentioned. According to an embodiment, a nanostructured layer 50 having polarizing effects allows to modulate the intensity of the projected light Lp related to a given object $O_1$ when modifying the polarization of the incident light L. This lets the various projected objects appearing and disappearing. Alternatively or in addition, a nanostructured layer 50 having a polarizing effect allows to modulate the colour of the corresponding object $O_1$ when modifying the polarization of the incident light L. It is thus understood that the micro-lens based module according to the present disclosure allows independently to switch on or off a projected object or to modulate or change its colour, using the appropriate polarizing effects of the nanostructured layer 50.

Since several nanostructured layers 50 can be combined or integrated within the micro-lens based module 10, each having their own diffractive domains D1, D2, it is possible to provide various effects, including concomitant, alternative, or successive changes of colours and shape of the projected objects.

It is noted that, while the nanostructure layer 50 may comprise diffractive domains having different properties, including some polarizing properties, it may also comprise non-polarizing domains. The corresponding projected light Lp remains unsensitive to the polarization characteristics of the incident light L.

The incident angles on a given nanostructured layer 50 may differ from one diffractive domains D1, D2 to another one. The corrugations 51a, 51b can thus be adapted, for example in terms of modulation periods, in a way to compensate the effects of the angle of incidence of the incident light L. The quality of the projected optical objects $O_1$, $O_2$ is thus improved. Alternatively or in addition, several layers having a polarizing effect can be stacked to improve the image quality, wherein one or more of the layer thickness and the modulation period is independently adapted from one layer to the others. The nanostructure layer 50 or the combination of nanostructured layers 50, is thus tuned for a specific narrowband range of incidence angles.

Alternatively or in addition, the nanostructured layer 50 can comprise at least one metallic layer adapted to provide plasmonic resonances and having at least one plasmonic area. Such a metallic layer may be for example a periodic silver nanowire or nano-periodic aluminium lamellas. A given plasmonic area can have polarization sensitive element 70 and provide polarization-selective colour filters properties (FIG. 6). In this way, the corresponding plasmonic area can generate a colour depending on the polarization characteristics of the incident light L. A second rotational polarizer P' can be placed between the exit lenses 41 and the remote surface S so that the colour of the projected objects $O_1$, $O_2$, resulting from the plasmonic effect can be modulated.

A given plasmonic area may in addition or alternatively comprise angular sensitive elements 60 and provide angular-selective colour filter properties. In this way, the corresponding plasmonic area can generate different colours depending on the incidence angle of the incident light L.

The different plasmonic areas can be arranged so as to correspond to some objects $O_1$, $O_2$ and/or to some diffractive domains D1, D2. Alternatively, the plasmonic areas are organized independently of the objects $O_1$, $O_2$ and/or the diffractive domains D1, D2. A homogenous plasmonic area can be related to a given lens, meaning that a given plasmonic effect will be associated to this given lens. For example, the nanostructure layer 50 may comprise some specific polarization sensitive 70 or angle sensitive 60 elements dedicated to some lenses. Alternatively, a given lens may correspond to more than one plasmonic areas, each having distinct plasmonic resonance properties. According to such an arrangement, the nanostructure layer 50 comprises at least two distinct plasmonic areas dedicated to a given lens, each of these plasmonic areas comprising a specific element either polarisation sensitive 70 or angle sensitive 60. It is for example possible that both polarization and angle related plasmonic effects are generated at a given lens, by means of several plasmonic areas. It is thus understood that any suitable space arrangement of the plasmonic areas can be contemplated depending on the needs.

According to another embodiment, the light alteration layer 50' denotes a nanostructured layer 50 comprising nanoparticles 50a embedded in a dielectric material, as better shown in FIG. 12. The nanoparticles 50a can be either uniformly arranged in the dielectric layer so as to uniformly modify the optical properties of the incident light L. Alternatively, such nanoparticles can be localized on predetermined areas which determine or corresponds to the diffraction domain (D1, D2). The nanoparticles, as well as the dielectric material, are selected among material known to produce such optical modification of the light. The concentration of the nanoparticles in the dielectric material is also appropriately selected.

It is understood that when a light alteration layer 50' according to the present disclosure denotes a nanostructured layer 50, it can comprise a combination of the above-described corrugations 51a, 51b, different polymeric structures 81a, 81b, plasmonic areas, polarization sensitive 70 and angle sensitive 60 elements.

The nanostructured layer 50 of the present micro-lens based module is designed to compensate one or more of the optical defects, such as the chromatic aberrations, and the angular sensitivity of the micro-lens based module. For example, the nanostructure layer 50 can comprise a meta-surface having metallic pillars embedded in a polymer. The nano-structuration can thus allow improving the quality of the whole projected image or only a part of the projected image for specific applications.

Since the polarizing effect is very sensitive to the angle of the incident light L, the nanostructures to achieve polarizing effects have to be properly arranged in the nanostructured layer 50. According to an embodiment, the local modulations of the nanostructured layer 50 are circumcentric, where the center of those circles is located at the intersection of the optical axis with the nanostructured layer 50 as shown for example in FIG. 8a.

Alternatively, those modulations are parallel or perpendicular to segmented or concentric n-sided polygonal shapes, where n is preferably larger than 12 as shown in FIG. 8b.

The distance h between the nanostructured layer 50 and a given lens, such as an entrance lens 21 of the micro-lens based module 10, can be determined according to the focal length f of the considered lens and the angle $\theta$ of the incident light impinging the nanostructured layer 50 as shown in FIG. 8. In particular, the angle $\theta$ of a light ray impinging the nanostructured layer 50 at a distance d from the optical axis can be approximated using the following equation E1:

$$\theta \cong a\sin\left(\frac{d}{f-h}\right),$$

where f is the focal distance of the lens and h is the distance between the lens and the nanostructured layer 50.

According to another embodiment, the light alteration layer 50' denotes an interference-based layer 50" or a combination of several interference-based layers 50" comprising one or several Interference domains I1,I2, as better shown in FIGS. 9 to 11. The interference-based layer comprises several transparent stacked layers each having independently from the others a thickness between around 1 and 900 nm so that interferences are produced on the incident light L. Alternatively, the thickness of the layers may be determined based on the wavelengths of the incident light. The thickness of the layers is preferably lower than the wavelengths of the incident light L or lower than a predetermined multiplier of the wavelengths such as lower than 2, 3, 5 or 5 times the wavelength. The projected light Lp is thus modified. The interference-based layer can be made on same or different material commonly used to produce such interferences. FIG. 10 shows an example of a micro lens array according to the present invention comprising only one interference domain. Such an interference domain can cover a subpart of the micro lens array or all the surface of the array or substantially all its surface. Such an interference-based layer can be used as a colour filter. Under such conditions, a colour can be obtained for one or all of the objects O1, O2 projected on the surface S. FIG. 11 shows another example wherein the present micro lens module comprises an interference-based layer 50" with more than one interference domain I1, I2. Each one of these interference domains extends on a sub surface of the micro lens module. Each one of the interference domains I1, I2 can be for example arranged so as to correspond to one of the projected objects O1, O2. Although the different interference domains can have the same optical properties, they preferably exhibit different optical properties. In particular, they can each be used as a different colour filter. Under such conditions, the projected objects O1, O2 corresponding to these different interference domains can have different colours.

According to a specific embodiment, the interference-based layer 50" comprises one or several interference domains I1, I2 each arranged in an optical channel, that is to say in vis-à-vis one lens or couple of lenses of the micro lens array. The projected objects O1, O2, resulting from the combination of the micro lens projection, the colour of the projected object corresponds to the superposition of the colours of all the interference domains I1, I2. Although all the interference domains can be identical, in such a configuration, interference domains or groups of interference domains are advantageously used as distinct colour filters.

According to another embodiment, the interference domains I1, I2 of the interference-based layer are used as a stop-band filter. As an example, certain wavelengths, such as infrared wavelengths, or wavelengths below or above a predetermined threshold, can be filtered out. In an advantageous arrangement, the present micro-lens module comprises an interference-based layer 50" adapted to back reflect the infrareds. The interference-based layer 50" can be placed before the patterning element if any. According to such an arrangement, the IR absorption is prevented or minimized, so as to avoid too much heating of the micro lens based module here described. In particular, when the micro lens module comprises metallic layers, which is often the case of the patterning elements 30, such interference-based layer appears a great advantage. Other wavelengths such as UV can also be considered. In addition or alternatively, some visible wavelengths, such as blue lights, can be removed or attenuated in the projected objects O1, O2.

It is here understood that in the micro lens based device according to the present disclosure the light alteration layer 50' denotes either a nanostructured layer 50, or an interference-based layer 50" or a combination of at least one nanostructured layer 50 and one interference-based layer 50". Although several layers can be stacked, a given light alteration layer 50' can comprise several distinct domain corresponding to the nanostructured layer 50 and to the interference-based layer 50".

According to an embodiment better shown in FIG. 13, in the micro lens based device according to the present disclosure, one or several diffractive optical elements (DOE) 91 can be arranged on the first lens array or close to an entrance lens 21. The incident light 90a originating from a coherent source provides a diffracted light 90b which is then detected by a suitable detector 95. Such an arrangement can be used as an optical security feature or as part identification, for example, by including in the read-out information the name of the product, the row/column in the production wafer, the product version, or any other suitable information. The diffractive optical element 91 can be included in addition of the light alteration layer above described. Alternatively, the diffractive optical element 91 can be integrated into, or combined with, the light alteration layer 50". In a preferred embodiment, one or both of the diffraction optical element 91 and the light alteration layer 50" are monolithically integrated to the entrance lens array. Alternatively or in addition, one or several diffractive optical elements (DOE) 91 can be arranged on the second lens array 40 or close to an exit lens 41.

The micro-lens based module 10 according to the present disclosure is preferably free of traditional patterning element 30. The optical objects O1, O2 are thus exclusively provided by the means of the light alteration layer 50', being a nanostructured layer 50, or an interference-based layer 50" or a combination of both, either statically or dynamically with an improved optical quality.

The micro-lens based module 10 according to the present disclosure may however optionally comprise a patterning element 30. The patterning element 30 denotes any object having an empty space allowing to transmit an incident light L toward a remote surface S. It can be for example a mask or any equivalent shading element. The patterning element is arranged so that the pattern it comprises is aligned with at least one entrance lens 21, and an exit lens 41, or one of the first lens array 20 or the second lens array 40. The patterning element 30 may be of one piece and comprise a repetitive pattern, each pattern facing a lens of the first 20 and/or the second 40 lens array. Alternatively, the patterning element 30 comprises several independent elements having a pattern, each element facing a lens of the first 20 and/or the second 40 lens array. A given pattern may correspond to one optical object O1 or a combination of several objects O1, O2. A given patterning element 30, although it comprises a repetitive pattern facing several lenses, can comprise one or several different patterns facing different lenses. Other arrangements may be envisaged according to the needs. The patterning element 30 is thus understood as any suitable shading device allowing to define a projected image. To this end, the shape of areas O1', O2' of the patterning element 30 can be identical to the shape of the projected objects O1, O2, but with reduced dimensions. In some configurations, the shape of the areas O1' O2' of the patterning element 30 can be distorted in a way to compensate potential angular deviation or other geometrical parameter, so that the projected objects have the suitable shape.

The optional one or more patterning element 30 is placed either behind the first lens array 20, before the second lens array 40 or between the first 20 and the second 40 lens arrays when both are present. The position of the patterning element 30 may however be adapted according to the focal properties of the micro-lenses and the application. The relative position of the lenses and the patterning element 30 can for example vary according to the nature and the distance of the remote surface S on which is projected the optical object O1, O2. Each pattern is understood as being in fact a micro-pattern having a two dimensional size of less than around 900 μm, or even less that around 500 or 200 μm. The patterning element 30 is arranged in a way that the patterns it comprises is placed at the focal point of an entrance lens 21 or at the focal point of an exit lens 40 or at the focal point of both an entrance lens 21 and an exit lens 41. specific patterns of the patterning element 30 can be placed in an optical channel C1, C2, C3, C4, defined by at least one of an entrance lens 21, an exit lens 41 or a couple of an entrance lens 21 and a corresponding exit lens 41. A given specific pattern may encode for all the lenses or for any part of the lenses.

An optical object O1, O2 denotes in the present disclosure the image projected on a surface S and corresponding either to a micropattern of the patterning element 30 or to the picture resulting from the diffractive domain D1, D2. An optical object O1, O2 thus also defines, or relates to, the specific shape of the corresponding micropattern of the patterning element and the corresponding diffractive domain D1, D2.

The light alteration layer 50', and in particular the nanostructured layer 50, can be integrated to the patterning element 30, when present. It can be for example arranged in the internal empty space defining the micropatterns of the patterning elements 30, and corresponding to the areas O1', O2' related to the projected objects O1, O2 According to an embodiment, the nanostructured layer 50 can be formed within the patterning element 30, either partly or integrally. In this way, the patterning element 30 comprises a nanostructured layer 50.

Alternatively, the light alteration layer 50', in particular when it denotes a nanostructured layer 50, can be combined to the patterning element 30, when present such as superimposed or juxtaposed, being in close contact with the patterning element 30.

Alternatively, the light alteration layer 50', whether it denotes a nanostructured layer 50 or a interference-based layer 50" better described below, can be distant from the patterning element 30, when present. FIG. 3 represents an example of such a relative arrangement of the nanostructure layer 50 and the patterning element 30. It can be for example placed at a distance comprised between 1 and around 200 μm from the patterning element 30. The nanostructured layer 50 can be placed anywhere relatively to the lenses and/or the patterning element 30. It can be for example placed before or behind the patterning element 30, with regard to the propagation of the incident light L. However, the light alteration layer 50' is preferably arranged so that each of its different diffractive domains D1, D2 corresponds to a pre-determined micropattern, or areas O1', O2', of the patterning element 30. For example, the nanostructure layer 50 can be related to a pattern comprising a first object O1' and a second object O2' so that a first diffractive domain D1 faces a first object O1' and the second diffractive domain faces the second object O2', or in case of interference based-layer 50", a first object O1' and a second object O2' so that a first interference domain I1 faces a first object O1' and the second interference domain I2 faces the second object O2'. The relationship between a diffractive domain D1, D2 and/or an interference domain I1, I2, and the corresponding object O1', O2' is defined according to the light pathway. The incident light L crossing a given diffractive domains D1, D2 also crosses the corresponding pattern related to the optical objects O1', O2'.

According to an embodiment, better shown on FIG. 4, a group of one or more lenses corresponds to one optical object or area O1' of the patterning element 30 and to one diffractive domain D1. Another group of one or more lenses corresponds to another optical object or area O2' and to a different diffractive domain D2.

According to another embodiment, better shown on FIG. 3, a given lens corresponds to a first O1' and a second O2' optical objects or areas of the patterning element 30 and to a first D1 and a second D2 respective diffractive domains. Such given lens can relate to an entrance lens 21 or an exit lens 41 or a couple of an entrance 21 and exit 41 lenses.

The micro-lens based module 10 according to the present disclosure can comprise only one of the two above-men-tioned arrangements or a combination of both. For example, each lens of the micro-lens based module may correspond to only one diffractive domain D1 of the nanostructured layer 50 and only one optical object O1' of the patterning element 30, or each lens of the MLA corresponds to two or more diffractive domains D1, D2 of the nanostructured layer 50 and two or more optical objects or areas O1', O2' of the patterning element 30, or part of the lenses of the MLA correspond to a single diffractive domain and a single optical object and part of the lenses correspond to several diffractive domains D1, D2 and several objects or areas O1', O2'.

The micro-lens based module according to the present disclosure may comprise more than one nanostructured layer 50. In case several nanostructures layers 50 are included in the micro-lens based module 10, they can independently be integrated to, combined to or distant from the patterning element 30, if present The nanostructure layer 50 may be of one piece and comprise a repetitive sequence of diffractive domains D1, D2, each sequence facing a lens of the first 20 and/or the second 40 lens array. Alternatively, the nanostruc-ture layer 50 comprises several independent elements having each a diffractive domain or a plurality of diffractive domains, each of these elements facing a lens of the first 20 and/or the second 40 lens array. A given micro-lens based module 10 can comprise a combination of one piece nano-structured layers and individual elements.

Independently of the above-described arrangements, the nanostructured layer 50 can show a polarizing effect. In particular, each of its diffractive domain D1, D2 can have a distinct polarising effect. A distinct polarizing effect means for example a distinct polarization direction. The local corrugations of the diffractive domains D1, D2 are adapted accordingly. When the incident light L is polarized and oriented in accordance with the local corrugations 51a, 51b of a given diffractive domain D1, then the light can pass across the corresponding optical object or area O1'. The diffractive domains having different polarization character-istics prevent the incident light L passing through the corresponding objects. It results that only the objects result-ing from the diffractive domain having the same polarization characteristics of the incident light L are projected on the remote surface S.

The present invention also relates to a projection device comprising one or several micro-lens based module 10 above described. The projection device according to the present disclosure thus comprises at least one micro-lens based module 10, and at least one light source emitting the incident light L. The light source can be selected among a LED an OLED or any suitable light emitting device. The wavelength is adapted according to the needs, as well as the relative position between the light source and the corre-sponding micro-lens based module 10. The light source of the projection device may be adapted to emit non polarized light. In that case, the projection device may comprise a polarizer P between the light source and the corresponding micro-lens based module 10. Such a polarizer is advanta-geously a rotational polarizer P, as shown in FIG. 5a, 5b. The rotation of the rotational polarizer P allows to modify the polarization characteristics of the incident light L and to select the optical objects O1, O2 to be projected on the remote surface S. A dynamic projection can be provided by continuously rotating the rotational polarizer P so that vari-ous refractive domains D1 are successively crossed by the incident polarized light L, resulting in the projection of various objects O1, O2. To this end, the rotational polarizer P may be provided with one or more magnetic elements which can be moved from an external permanent magnet or electromagnet. Other suitable actuating means can be con-templated according to the needs.

Alternatively or in addition, the projection device may comprise a second polarizer (not represented) behind the exit lenses 41. This second polarizer may be fix or rotational.

Alternatively or in addition, the light source of the pro-jection device according to the present disclosure is adapted to emit polarized light. An actuator adapted to rotate the light source or the corresponding micro-lens based module 10 or both allows to provide a dynamic projection on the surface S.

In the preferred arrangement, the colours of the projected objected O1, O2 do not result from pigments but rather from the diffraction properties of the diffractive domains D1, D2 of the nanostructured layer 50, and/or from the interference domains I1, I2 of the interference-based layer 50" This does not exclude however that additional coloured filters are used, either externally or integral to the present micro-lens based module. Such additional coloured filter may be inte-grated within the projection device between the light source and the micro-lens based module.

In another preferred embodiment, the colours of the projected objected O1, O2 do not result from LCD derived element but rather from the diffraction properties of the diffractive domains D1, D2 and/or from the interference domains I1,I2 of the interference-based layer 50" This does not exclude however that additional coloured LCD derived element are used, either externally or integral to the present micro-lens based module. Such additional coloured LCD derived elements may be integrated within the projection device between the light source and the micro-lens based module 10.

According to a variant of the present projection device, the rotation polarizer P may be fixed and one or several light alteration layers 50', such as a nanostructured layer 50 or an interference-based layer 50", can be rotated so as to produce the above-mentioned effects related to the intensity and the colour of the projected optical object O1, O2.

According to another variant of the present projection device, the patterning element 30, when present comprises several independent elements having each a micropattern, which can be actuated to physically rotate the corresponding micropattern.

The rotating polarizer P, when present, can face all the lenses of the corresponding micro-lens module 10 or only part of them, letting some unpolarized light arriving at some lenses. Alternatively, several polarizers, either rotational or fixed, can be arranged between the light source and the lenses of the micro-lens module 10, allowing simultaneously irradiating the lens arrays with incident light L differently polarized. Such an arrangement allows for providing a large diversity of optical effects with only one light source.

It is highlighted that, according to present disclosure, several optical objects O1, O2 can be alternatively or successively projected on a surface S using only one multi-lens array 10. Such an arrangement thus avoids the bulky duplication of multi-lens arrays to provide dynamic and/or coloured images. This however does not prevent to combine the presently described micro-lens based module 10 with other MLAs having same or different properties.

It is further highlighted that a single light source allows the projection of several optical objects, in a successive or alternative way. This does not exclude the use of several light sources. In case several light sources are used, they may be identical or different so that the wavelengths, the light polarisation and/or the incidence angle of the light toward the micro-lens based module 10 can be modulated or adapted. The resulting optical defects are adequately compensated or corrected by means of the arrangement here described. In particular, one or more of the polarization sensitive set of elements 70 and angle sensitive set of elements 60 are properly designed to compensate the optical distortions, chromatic aberrations and any other optical defects.

It is further highlighted that not only the shape of the projected objects O1, O2 can be projected or hidden but also the colour can be modulated.

According to an embodiment, the light alteration layer 50', including the nanostructured layer 50 and the interference-based layer 50", and the corresponding distinct domains D1, D2,I1,I2, are predetermined and adapted to the arrangement of the projection device, including the number, the nature and the position of light source and the number, the nature and the position of the micro-patterns when present, and the type or position of the surface S. The nanostructured layer 50 and/or the interference-based layer 50" is thus definitively integrated within the micro-lens based module. According to an alternative embodiment, the nanostructured layer 50 and/or the interference-based layer 50", may be removably combined or integrated to a micro-lens based module in a way to adapt the micro-lens based module to various settings, each comprising different lights, micropatterns or screen arrangements. According to an alternative embodiment, different nanostructured layers 50 and/or interference-based layers 50", can be removably combined or integrated to a micro-lens based module 10 so as to differently modulate the projected optical objects of a given projection device, comprising a given light, micropattern and projection surface S arrangement.

It is here mentioned that the remote surface S can be any surface visible from a passenger or a user placed in the vehicle. A welcome message can thus be projected on an internal surface of a vehicle. Alternatively, the remote surface may be the ground around the vehicle. Optical signals can be projected when a user is approaching the vehicle. Alternatively or in addition, specific optical objects O1, O2 can be projected on a surface S in response to a predetermined situation. An alert message or a warning optical signal can thus be projected to the attention of the driver or a passenger. The optical message is advantageously animated so that a more precise indication is provided. For example, flashing projection, or dynamic indication of a direction can instantaneously alert the driver in a convenient and precise way. The same projection device can be used for safety and non-safety messages. A diversity of projected objects is possible by means of the compact micro-lens based module 10 and the corresponding projection device according to the present disclosure.

The remote surface S can alternatively be a sensor allowing to automatically treat the projected optical signal. High optical quality is here necessary and possible thanks to the micro-lens based module 10 presently described. According to an embodiment, the projection device according to the present disclosure can integrate a sensor arranged behind the micro-lens based module with regard to the corresponding light source.

The present invention further relates to an equipment comprising the projection device above described. Such an equipment includes vehicles such as cars, boats aircrafts and any related vehicles. The equipment comprises at least one surface facing the projection device. The surface S is preferably visible from a user or a passenger of the vehicle, so that the projected objects are visible. The projected pictures can alternatively be projected on an external surface around the vehicle to be visible from people abroad. The projected pictures may be non human visible and projected abroad the vehicles so that obstacles are detected by adequate sensors, or on a surface not visible from the passengers, such as an optical sensor. For example, an Infra-Red pattern can be projected abroad the vehicle so that it is detected by the sensor of the parking system or any other detection system, to predict the distance of the vehicle to an obstacle. This IR light can then be deactivated by rotating the polarizer P when it is not needed.

The present disclosure also describes a method of dynamically projecting different optical objects O1, O2 on a surface S. The optical objects are those resulting from the combined or superposed images of at least one light alteration layer 50', being either a nanostructured layer 50 or an interference-based layer 50", comprising several distinct domains adapted to modulate one or more of the intensity and the colour of an incident light L. The nanostructured layer 50 may be as described here. In particular, the distinct domains denote or comprise different diffractive domains D1, D2 as above described, or different interference domains I1, I2, described below, wherein said diffractive domains and interference domains have various distinct optical effects such as light polarization effects or diffractive or interference colour effects. The distinct domains may also denote or comprise plasmonic areas comprising one or more sets of polarization sensitive elements 70 and angle sensitive elements 60. It is understood that all the distinct domains, including those having polarizations effects and those related to the plasmonic resonance, can be arranged on a single nanostructured layer 50 or dispatched over several stacked nanostructured layers 50. At least part of the corrugations 51*a*, 51*b* of these distinct domains is adapted to compensate the optical defects of the projected objects O1, O2 whether these defects results from the angle of incidence of the incident light L or from the polarisation of the incident light or from the colour of the incident light L. Preferably, the plasmonic areas, or parts of the plasmonic areas, are dedicated to the correction or the compensation of the optical defects by means of polarisation sensitive elements 70 or angle sensitive elements 60 or the combination of both polarisation sensitive elements 70 or angle sensitive elements 60.

The present method comprises the optional step of combining or associating one or more patterning elements 30 to the nanostructured layer 50. The patterning element 30 may be as above-described. It is in particular integrated or combined to a micro-lens based module 10.

The present method further comprises a step of irradiating the micro-lens based module 10 with an incident light L so that the light can progress through the distinct domains of the light alteration layer 50', being nanostructured layer 50 and/or interference-based layer 50", and through the micropatterns of the patterning element 30 if present, to provide a projected light Lp. The distinct domains of the nanostructured layer 50 can be arranged with respect to the micropatterns as above-described. In particular, one or more of a diffractive domain D1, D2 and a plasmonic area having the same optical properties can be associated to a given micropattern or a given set of micropatterns or area O1', O2', so that one selected optical object O1, O2 among several optical objects can be modulated either in intensity or in colour. The light source and the micro-lens based module may be combined within a projection device.

The present method comprises a step of dynamically modulating one or more of the polarisation, the incidence angle and the colour of the incident light L or the projected light Lp so as to provide a dynamic projection of the optical objects O1, O2 on the surface S. The polarisation of the incident light L can be modulated by means of at least one rotational polarizer P placed between the light source and the light alteration layer 50', being nanostructured layer 50 and/or interference based layer 50". A set of several rotational polarizers can be contemplated. The polarisation of the projected light Lp can be modulated by means of a second rotational polarizer or a set of polarizers placed between the light alteration layer 50", being nanostructured layer 50 and/or interference based layer 50", and the projection surface S. The angle of the incident light L may be kept fixed with regard to the corresponding micro-lens based module and comprised between 0° and 20°. Alternatively, the incident angle may be dynamically modulated by means of an actuator modifying either the position of the micro-lens based module 10 or the position of the light source. Alternatively a second light source may be activated so as to change the incidence angle of the incident light L.

In case several light sources are used, they can have different wavelengths. They can alternatively or in addition emit a differently polarized light, including non-polarized light.

In the present method, the surface S can be a remote non transparent surface wherein the projected objects O1, O2 are human visible images. Alternatively, the surface S denotes an optical sensor wherein the projected objects O1, O2 are optical signals which are electronically processed.

REFERENCE SYMBOLS IN THE FIGURES

10 Multi-lens array
20 First lens array

21 Entrance lenses
30 Patterning element
40 Second lens array
41 Exit lenses
50 nanostructured layer
50' Light alteration layer
50" Interference-based layer
51*a*, 51*b* Local corrugations
60 Angular sensitive element
70 Polarization sensitive element
80, 81*a*, 81*b* Polymeric structure
90*a* Light from a coherent source
90*b* Diffracted light
91 Diffractive optical element
95 Detector
O1 First object
O1' Area corresponding to the first object
O2 Second object
O2' Area corresponding to the second object
D1 First diffractive domain
D2 Second diffractive domain
I1 First interference domain
I2 Second interference domain
L, Lp Incident and Projected light

What is claimed is:

1. A micro-lens based module comprising more than one entrance lens, more than one exit lens or a combination of more than one entrance lens and more than one exit lens, the micro-lens based module being adapted for projecting different optical objects on demand on a remote surface when placed to shade-out a single incident light, wherein said micro-lens based module further comprises at least one light alteration layer adapted to modify the optical properties of said incident light, said at least one light alteration layer being:

a nanostructured layer comprising one or several diffractive domains each of said one or several diffractive domains comprises local corrugations having a width lower than the incident wavelength or lower than 5 times the incident wavelength, wherein at least some of said diffractive domains have polarizing effects adapted to modulate the intensity of the projected objects so as let them appear and disappear or to modulate their colour when a polarization of the incident light is modified, or said at least one light alteration layer being an interference-based layer comprising one or several interference domains adapted to be used as colour filters or stop-band filters, or said at least one light alteration layer being a combination of one or several nanostructured layer and one or several interference based layer, wherein said diffractive domains or said interference domains are aligned with one of said entrance lens or exit lens or both, and wherein the shape of said diffractive domains and/or interference domains denotes areas which correspond to the shape and/or the colour of said optical object so that the projected optical object results from the combined or superimposed images of at least one light alteration layer wherein the shape of the object can be projected or hidden and/or its colour and/or its intensity can be modulated.

2. The micro-lens based module according to claim 1, the width of said local corrugations being adapted according to the angles of the incident light in that specific place of the corresponding lens within the micro-lens based module, or to a combination of the applied wavelengths and the angle of the incident light at the corresponding specific place of the lens within the micro-lens based module so as to compensate the effects of the angle of incidence of the incident light on the areas corresponding to the optical objects.

3. The micro-lens based module according to claim 1, wherein a distance between said nanostructured layer and a corresponding lens is determined according to the focal length f of the corresponding lens and the angle θ of the incident light impinging the nanostructured layer at a distance d from the optical axis according to the equation:

$$\theta \cong a\sin\left(\frac{d}{f-h}\right),$$

wherein f denotes the focal distance of the lens and h is the distance between the lens and the nanostructured layer.

4. The micro-lens based module according to claim 1, wherein said at least one nanostructured layer comprises at least one metallic layer adapted to provide plasmonic resonance on at least one plasmonic area.

5. The micro-lens based module according to claim 4, wherein said at least one plasmonic area comprises one or more sets of polarisation sensitive elements and angular sensitive elements.

6. The micro-lens based module according to claim 1, wherein said nanostructured layer comprises metasurfaces having metallic or dielectric pillars embedded in a dielectric material.

7. The micro-lens based module according to claim 1, wherein said nanostructured layer comprises metallic or dielectric nanoparticles embedded in a dielectric material.

8. The micro-lens based module according to claim 1, wherein said light alteration layer is an interference-based layer or a combination of stacked interference-based layers comprising one or several interference domain wherein said one or several interference domains extend on a surface corresponding to the width of an optical channel, or to a surface larger than the width of an optical channel, or covers all the optical channels.

9. The micro-lens based module according to claim 1, wherein each one of said interference domain represents a colour filter, either identical or different, or a stop-band filter.

10. The micro-lens based module according to claim 1, wherein said interference-based layer is formed by stacked thin-films.

11. The micro-lens based module according to claim 1, further comprising one or more patterning element comprising micropatterns, wherein the shape of which defines areas corresponding to one or several projected optical objects.

12. The micro-lens based module according to claim 11, wherein said patterning element and said light alteration layer are combined or integrated so as to form one integral piece.

13. The micro-lens based module according to claim 1, further comprising a diffractive optical element adapted to diffract an incident light emanating from a coherent source into a diffracted light and a detector adapted to read out such diffracted light.

14. The micro-lens based module according to claim 13, wherein said diffractive optical element is combined or integrated to said light alteration layer, being either a nanostructured layer or an interference-based layer.

15. A projection device comprising one or more micro-lens based module according to claim 1, at least one light source adapted to emit an incident light, wherein
said incident light is polarized, said projection device further comprising an actuator adapted to rotate one or both the light source and the corresponding micro-lens based module relatively to each other, or
said incident light is not polarized, said projection device further comprising at least one rotatable polarizer and an actuator adapted to rotate said at least one polarizer.

16. The projection device according to claim 15, said micro-lens based module and said at least one light source being arranged so that the angle of the incident light with regard to said micro-lens based module is comprised between around 0° and around 20°.

17. A vehicle comprising a projection device according to claim 15.

18. A method of dynamically projecting different optical objects on a surface, each of said projected optical object resulting from the illumination of a micro-lens based module according to claim 1, the method comprising the steps of:
illuminating at least one of said micro-lens based module with at least one light source so that the light can progress through the distinct domains of the light alteration layer to provide a projected light; and
dynamically modulating one or more of polarisation, the incidence angle, and the colour of the incident light of the projected light, so as to provide a dynamic projection of the optical objects on the surface.

19. The method according to claim 18, further comprising an optional step of combining a patterning element.

20. The method according to claim 18, wherein said surface is a remote surface and said projected objects are human visible images, or wherein said surface is an optical sensor and said projected objects are optical signal which are electronically processed.

* * * * *